(12) United States Patent
Hsu (10) Patent No.: US 9,586,332 B2
(45) Date of Patent: Mar. 7, 2017

(54) CURTAIN CUTTING MACHINE

(71) Applicant: Chin-Fa Lin, New Taipei (TW)

(72) Inventor: Hao-Yu Hsu, New Taipei (TW)

(73) Assignee: Chin-Fa Lin, New Taipei (TW)

( * ) Notice: Subject to any disclaimer, the term of this patent is extended or adjusted under 35 U.S.C. 154(b) by 36 days.

(21) Appl. No.: 14/804,573

(22) Filed: Jul. 21, 2015

(65) Prior Publication Data

US 2017/0021518 A1  Jan. 26, 2017

(51) Int. Cl.
*B26D 1/00* (2006.01)
*B26D 7/02* (2006.01)
*B26D 1/03* (2006.01)

(52) U.S. Cl.
CPC ............... *B26D 7/02* (2013.01); *B26D 1/03* (2013.01); *B26D 1/035* (2013.01); *B26D 2001/006* (2013.01)

(58) Field of Classification Search
CPC . B26D 7/02; B26D 1/03; B26D 1/035; B26D 2001/006
USPC .................................................. 83/196, 569
See application file for complete search history.

(56) References Cited

U.S. PATENT DOCUMENTS

| | | | | |
|---|---|---|---|---|
| 3,513,740 A * | 5/1970 | Burghart | ............... | B23D 21/00 83/196 |
| 3,664,221 A * | 5/1972 | Breetvelt | ............... | B23D 21/00 83/196 |
| 5,357,833 A * | 10/1994 | Biagiotti | ............... | B26D 7/02 269/130 |
| 7,506,567 B2 * | 3/2009 | Simokovic | ............ | B23D 23/00 29/24.5 |
| 2003/0070515 A1 * | 4/2003 | Huang | ................... | B23D 23/00 83/13 |
| 2004/0173078 A1 * | 9/2004 | Gilboy | ................... | B23D 23/00 83/522.19 |
| 2005/0150344 A1 * | 7/2005 | Nien | ........................ | B26D 5/08 83/651 |
| 2006/0156882 A1 * | 7/2006 | Kollman | ................ | B23D 23/00 83/167 |
| 2007/0169601 A1 * | 7/2007 | Yu | .......................... | B23D 23/00 83/452 |
| 2007/0277657 A1 * | 12/2007 | Hilgendorf | .......... | B23D 45/124 83/13 |
| 2007/0295176 A1 * | 12/2007 | Kollman | ................ | B23D 23/00 83/13 |

(Continued)

*Primary Examiner* — Sean Michalski
(74) *Attorney, Agent, or Firm* — Alan D. Kamrath; Kamrath IP Lawfirm, P.A.

(57) ABSTRACT

A curtain cutting machine contains: a base, a first cutting mechanism, and a movable platform. The base includes a fixed platform having a front segment and a rear segment. The first cutting mechanism includes a lower cutting assembly with plural first orifices and has an upper cutting assembly with at least one second orifice. The movable platform includes two support racks, two slidable adjusting devices, and a holding plate. The two support racks are arranged on a rear side of the fixed platform of the base and extend upwardly, each of the two slidable adjusting devices is mounted on each of the two support racks and moves forward and backward on each of the two support racks, the holding plate is connected with each slidable adjusting device to hold a curtain, and the holding plate moves forward and backward on the two support racks with the two slidable adjusting devices.

8 Claims, 9 Drawing Sheets

(56) References Cited

U.S. PATENT DOCUMENTS

| | | | |
|---|---|---|---|
| 2009/0031876 A1* | 2/2009 | Caputo | B23D 45/003 83/648 |
| 2013/0074669 A1* | 3/2013 | Swopes | B26D 3/16 83/76.9 |
| 2014/0290457 A1* | 10/2014 | Lee | E06B 9/66 83/452 |

* cited by examiner

CURTAIN CUTTING MACHINE

BACKGROUND OF THE INVENTION

Field of the Invention

The present invention relates to a curtain cutting machine which enhances space using efficiency and using range.

Description of the Prior Art

A conventional curtain is employed to shield or decorate a window in a building, wherein a blind curtain is most popular and contains a first rail, a second rail, and plural blinds. As producing the blind curtain in various sizes (i.e., widths of the first rail, the second rail, and the plural blinds are different to form a plurality of blind curtains of different widths), hence a curtain cutting machine cuts and trims a plurality of blind curtains at different widths based on using requirements.

However, a mold of the curtain cutting machine cannot be replaced to be applicable for various curtains. This is, one curtain cutting machine is only used for one curtain in a fixed specification, so as cutting curtains of various specifications, a variety of curtain cutting machines are required, thus causing high equipment cost and occupying using space.

To overcome such a problem, a multi-function curtain cutting machine has a plurality of molds applicable for curtains of various specifications. Nevertheless, a length and a width of the multi-function curtain cutting machine are limited, and the multi-function curtain cutting machine merely has a single-layer cutting unit, thus limiting using specification.

The present invention has arisen to mitigate and/or obviate the afore-described disadvantages.

SUMMARY OF THE INVENTION

The primary objective of the present invention is to provide a curtain cutting machine which cuts a curtain by matching a fixed platform of a base with a lower cutting assembly of a first cutting mechanism or a cut set of a second cutting mechanism, and a movable platform cooperates with an upper cutting assembly of a first cutting mechanism to cut the curtain, thus enhancing space using efficiency of the curtain cutting machine and suitable specification range.

Accordingly, a curtain cutting machine provided by the present invention contains a base, a first cutting mechanism, and a movable platform.

The base includes a fixed platform, and the fixed platform has a front segment and a rear segment.

The first cutting mechanism is disposed on a first end of the base and includes a lower cutting assembly and an upper cutting assembly, wherein the lower cutting assembly has a plurality of first orifices flushing with the base, and the upper cutting assembly is mounted on the lower cutting assembly and has at least one second orifice.

The movable platform is secured on the fixed platform of the base and includes two support racks, two slidable adjusting devices, and a holding plate, wherein the two support racks are arranged on a rear side of the fixed platform of the base and extend upwardly, each of the two slidable adjusting devices is mounted on each of the two support racks and moves forward and backward on each of the two support racks, the holding plate is connected with each slidable adjusting device to hold a curtain, and the holding plate moves forward and backward on the two support racks with the two slidable adjusting devices, when the holding plate moves forward to a predetermined position, it aligns with the at least one second orifice of the upper cutting assembly of the first cutting mechanism.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

With reference to FIGS. 1 to 6, a curtain cutting machine according to a preferred embodiment of the present invention is adapted to cut a curtain and include a base 1, a first cutting mechanism 2, a second cutting mechanism 3, and a movable platform 4. The base 1 includes a fixed platform 11, and the fixed platform 11 has a front segment 111 and a rear segment 112. The first cutting mechanism 2 is disposed on a first end of the base 1 and includes a lower cutting assembly 21 and an upper cutting assembly 22, wherein the lower cutting assembly 21 has a plurality of first orifices 211 flushing with the fixed platform 11 of the base 1, and the upper cutting assembly 22 is mounted on the lower cutting assembly 21 and has at least one second orifice 221. The second cutting mechanism 3 is fixed on a second end of the base 1 opposite to the first cutting mechanism 2 and includes a cut set 31 having plural third orifices 311 which flush with the fixed platform 11 of the base 1. The movable platform 4 is secured on the fixed platform 11 of the base 1 and includes two support racks 41, two slidable adjusting devices 42, a holding plate 43, and a clamp device 44. The two support racks 41 are arranged on a rear side of the fixed platform 11 of the base 1 and extend upwardly, wherein each support rack 41 has a post 411, a tilted piece 412 mounted on a top end of the post 411, and two seats 413 disposed on one side surface of the tilted piece 412, wherein each seat 413 has a first aperture 4131 passing through two sides thereof and has a second aperture 4132 defined in one end thereof. Each of the two slidable adjusting devices 42 is mounted on each of the two support racks 41 and has a fixing mount 421 in which a sliding stem 422 is fixed, wherein the fixing mount 421 has a first driving element 4211, a second driving element 4212, and a third driving element 413, the sliding stem 422 is inserted into the first aperture 4131 of each seat 413 of each support rack 41 to slide forward and backward. The holding plate 43 is connected with the fixing mount 421 of each slidable adjusting device 42 and slants downwardly from its rear end to its front end, such that a curtain is held on the holding plate 43. The holding plate 43 has a stopping portion 431 arranged on a front rim of a top surface thereof to stop the curtain and has a pulling portion 432 formed on a bottom surface thereof to pull the holding plate 43 to move frontward and backward on the two support racks 41 by ways of the two slidable adjusting devices 42. When the holding plate 43 is moved forward to a predetermined position, it aligns with the at least one second orifice 221 of the upper cutting assembly 22 of the first cutting mechanism 2. Furthermore, the clamp device 44 is mounted on the holding plate 43 and has a pressing unit 441 and a clamping unit 442 for clamping the curtain.

When the lower cutting assembly 21 of the first cutting mechanism 2 or the cut set 31 of the second cutting mechanism 3 cuts the curtain, the holding plate 43 of the movable platform 4 slides to the predetermined position with the two slidable adjusting devices 42, and the first driving element 4211 and the second driving element 4212 of the fixing mount 421 retain in the at least one second orifice 221 of the two seats 413 of the two support racks 41 to position the two slidable adjusting devices 42 and the holding plate 43 and to avoid interfering the holding plate 43, hence the curtain is placed on the fixed platform 11 of the base 1. Thereafter, a part of the curtain is inserted into the plurality of first orifices 211 of the lower cutting assembly 21 of the first cutting mechanism 2 or the plural third orifices 311 of the cut set 31 of the third cutting mechanism 3 so that the curtain is cut by the lower cutting assembly 21 of the first cutting mechanism 2 or the cut set 31 of the second cutting mechanism 3.

Figure 1:
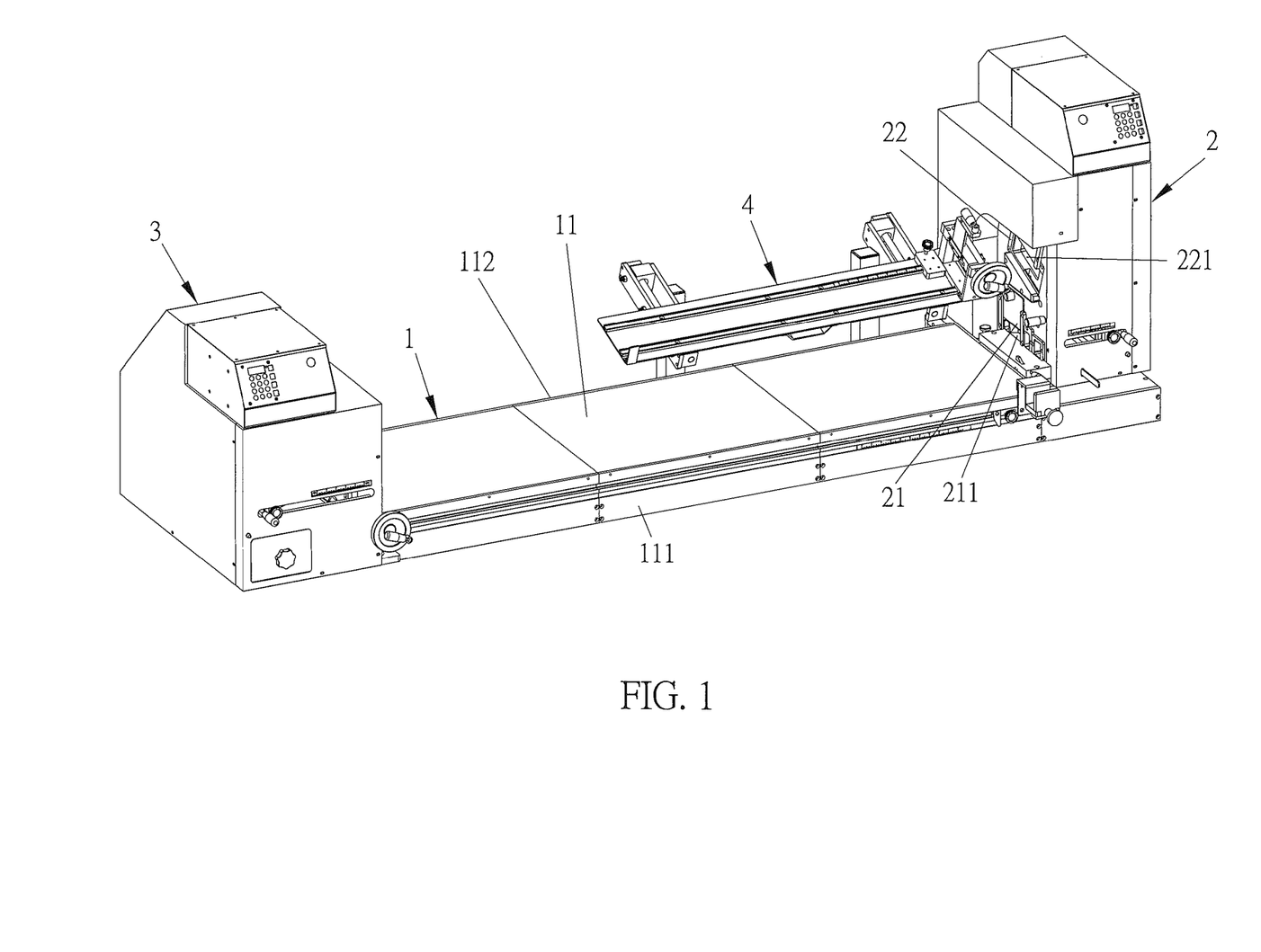
FIG. 1 is a perspective view showing the assembly of a curtain cutting machine in accordance with a preferred embodiment of the present invention.
Figure 2:
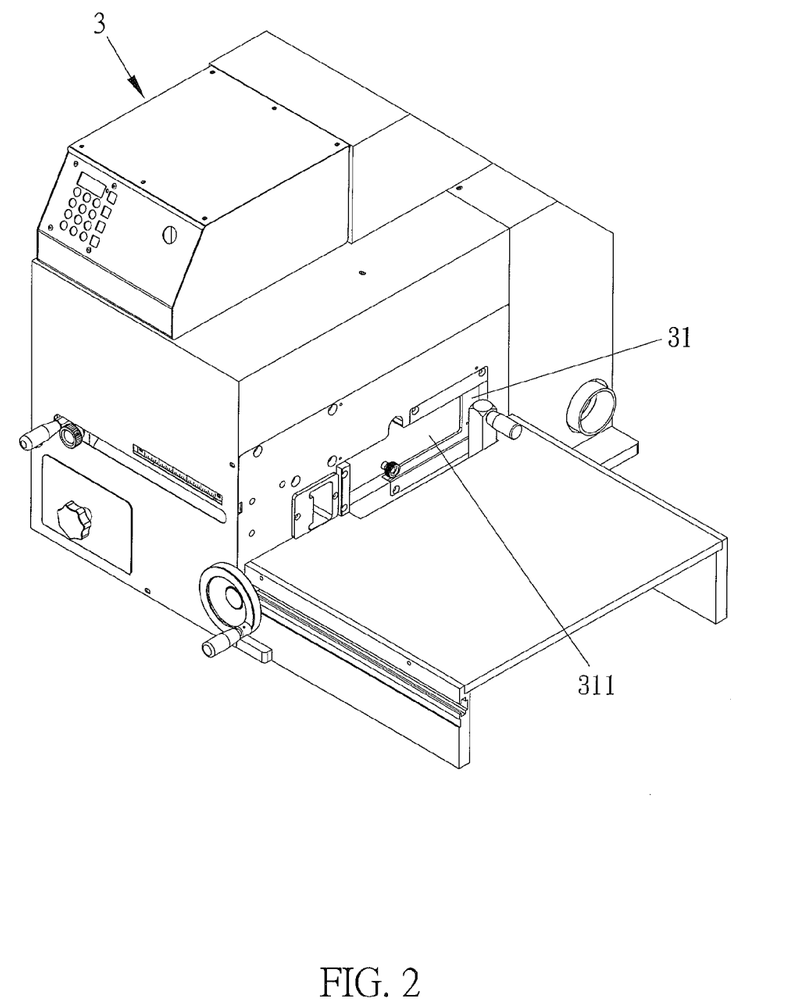
FIG. 2 is another perspective view showing the assembly of the curtain cutting machine in accordance with the preferred embodiment of the present invention.
Figure 3:
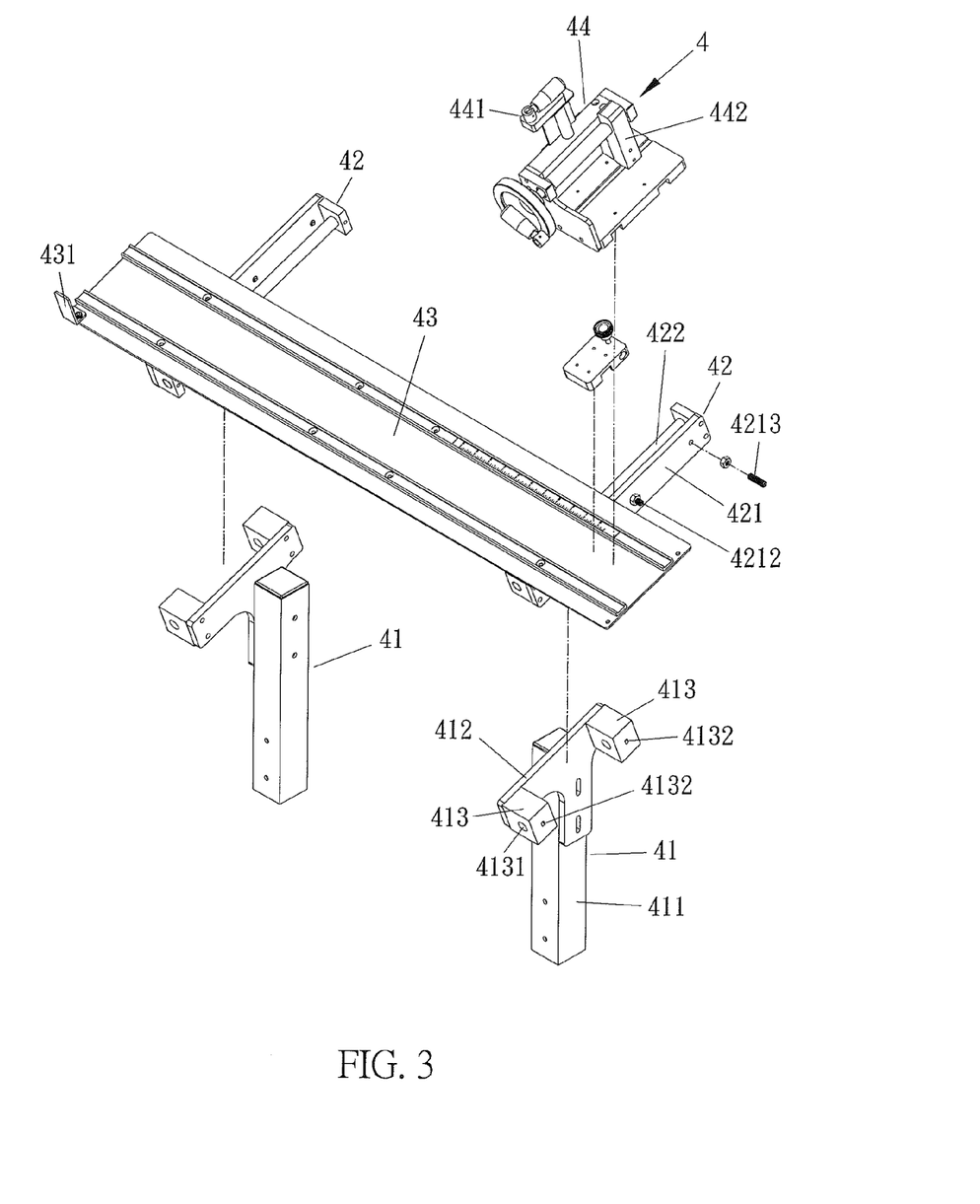
FIG. 3 is a perspective view showing the exploded components of a movable platform of the curtain cutting machine in accordance with the preferred embodiment of the present invention.
Figure 4:
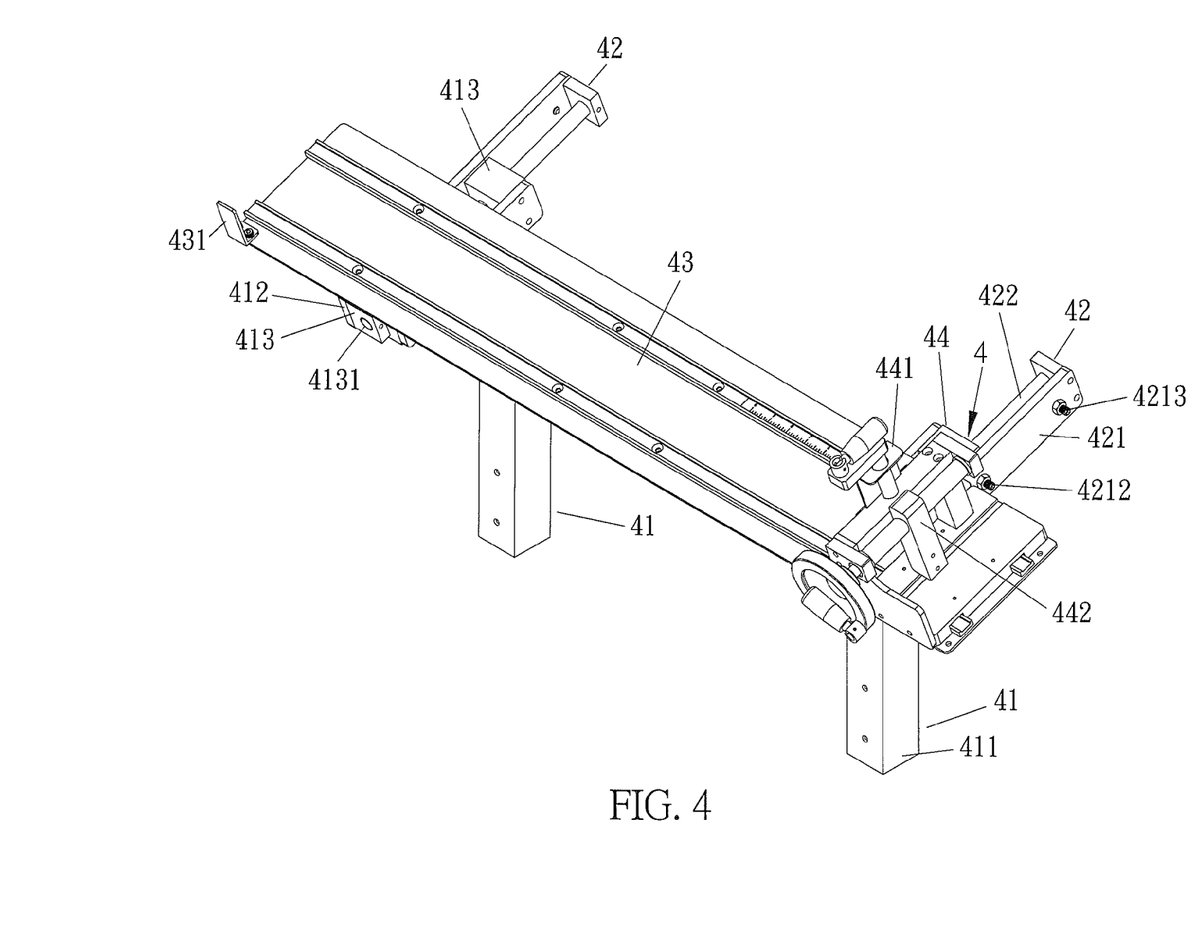
FIG. 4 is a perspective view showing the assembly of the movable platform of the curtain cutting machine in accordance with the preferred embodiment of the present invention.
Figure 5:
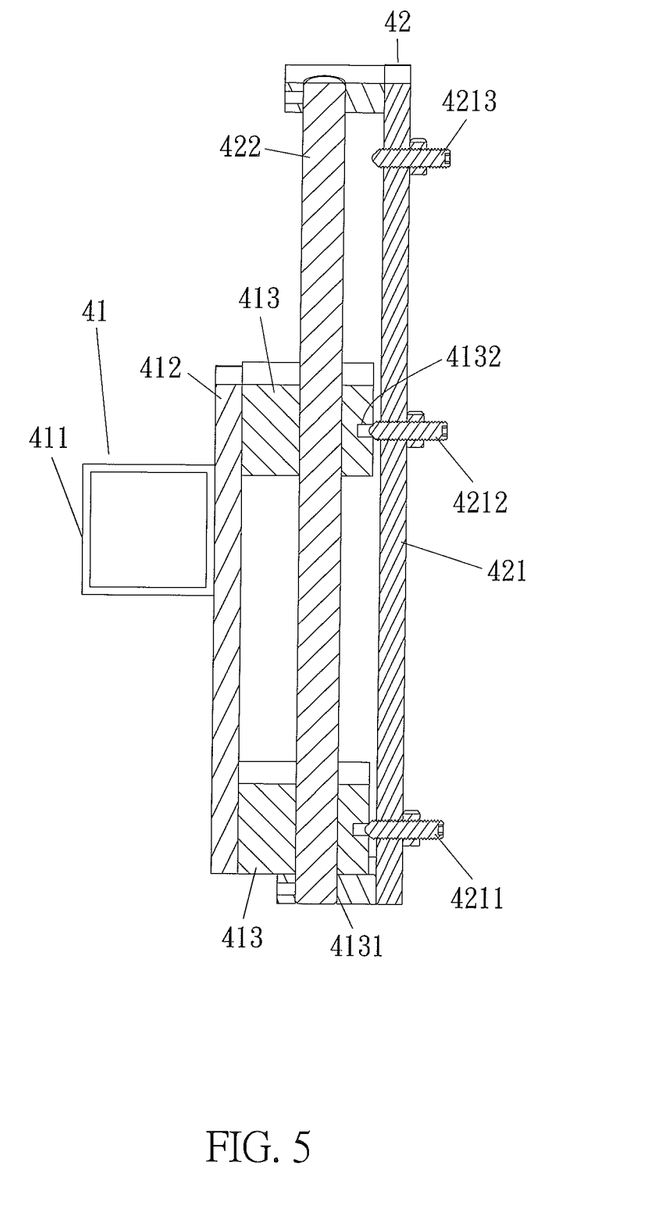
FIG. 5 is a cross sectional view showing the operation of a holding plate of the movable platform of the curtain cutting machine in accordance with the preferred embodiment of the present invention.
Figure 6:
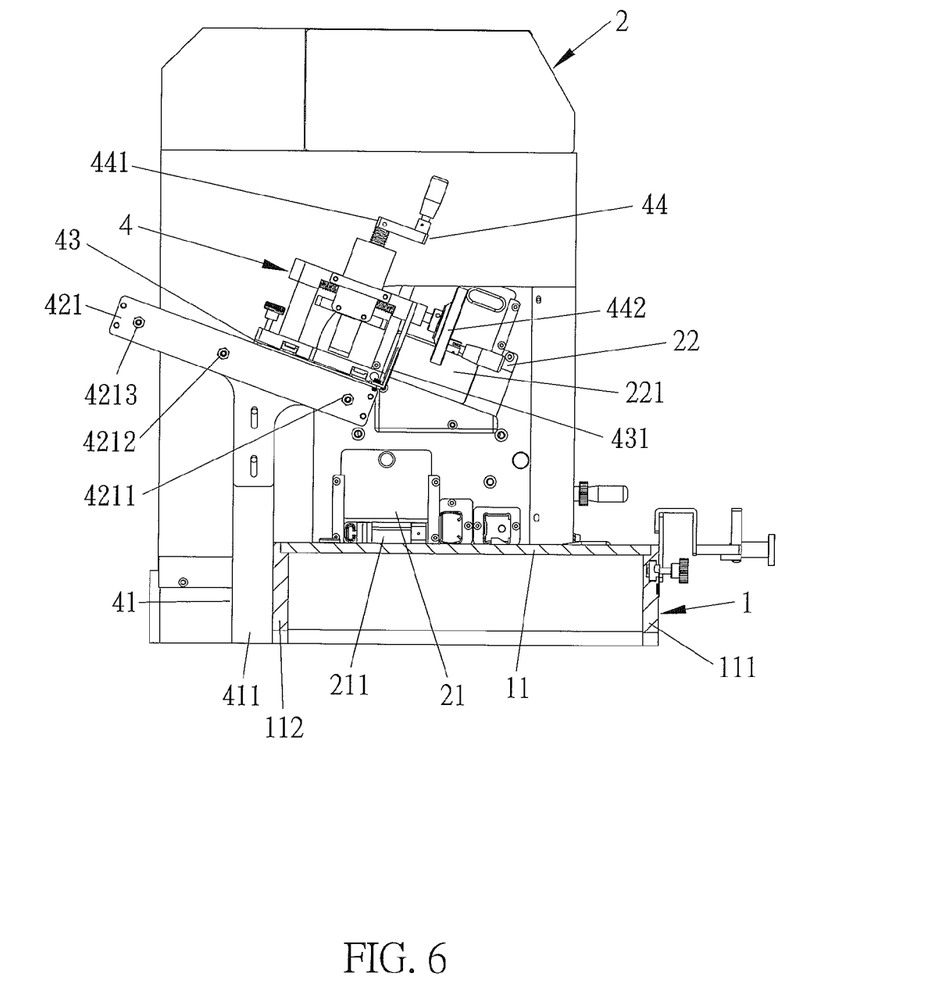
FIG. 6 is a cross sectional view showing the operation of a lower cutting assembly of a first cutting mechanism of the curtain cutting machine in accordance with the preferred embodiment of the present invention.
Figure 7:
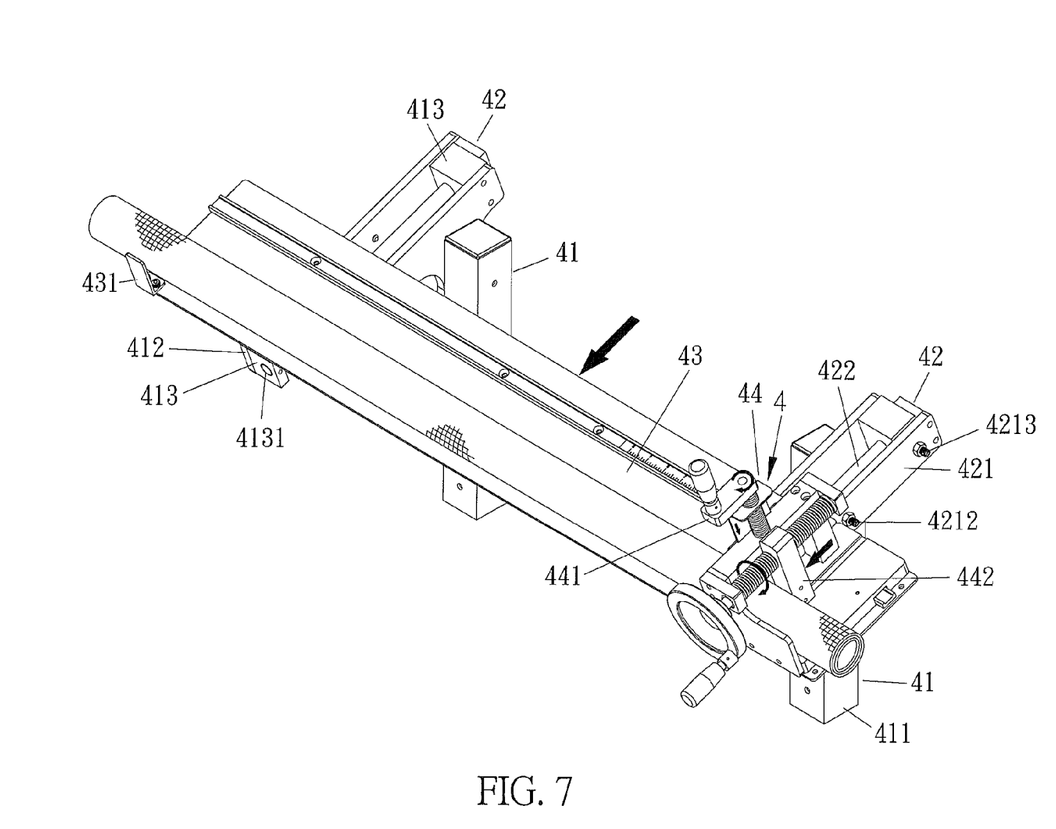
FIG. 7 is a perspective view showing the operation of the holding plate of the movable platform of the curtain cutting machine in accordance with the preferred embodiment of the present invention.
Figure 8:
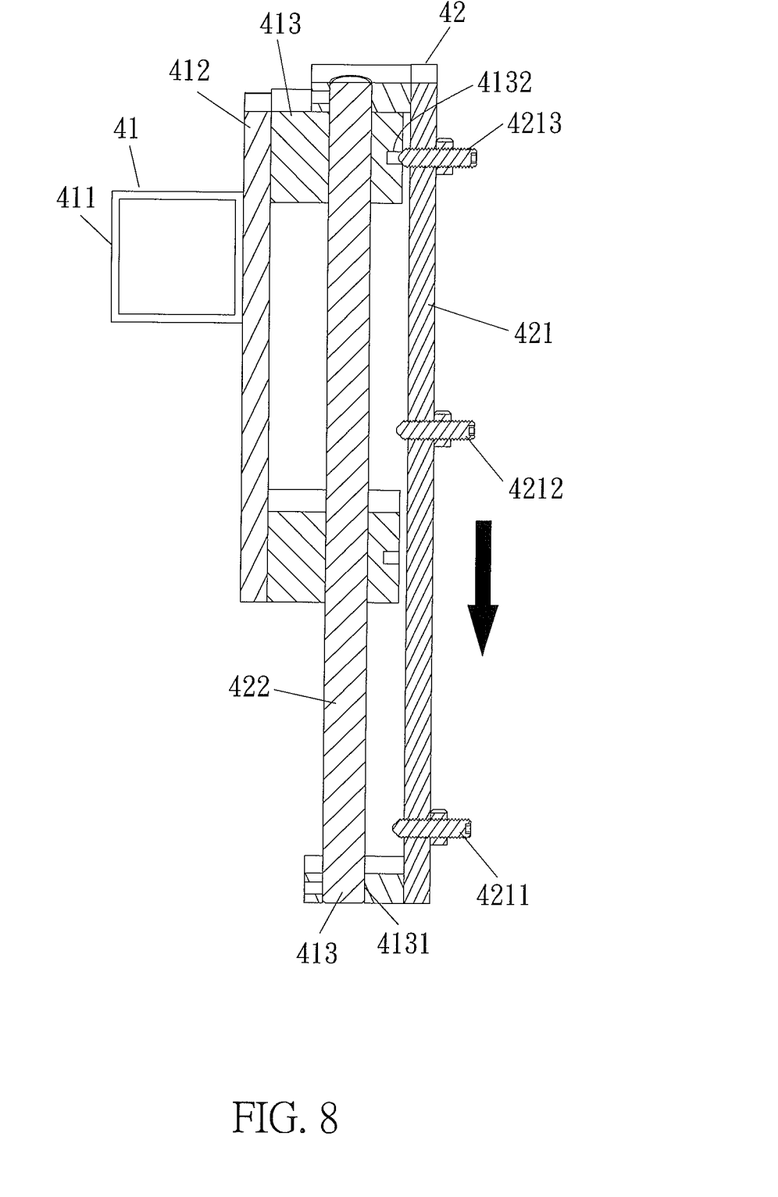
FIG. 8 is another cross sectional view showing the operation of the holding plate of the movable platform of the curtain cutting machine in accordance with the preferred embodiment of the present invention.
Figure 9:
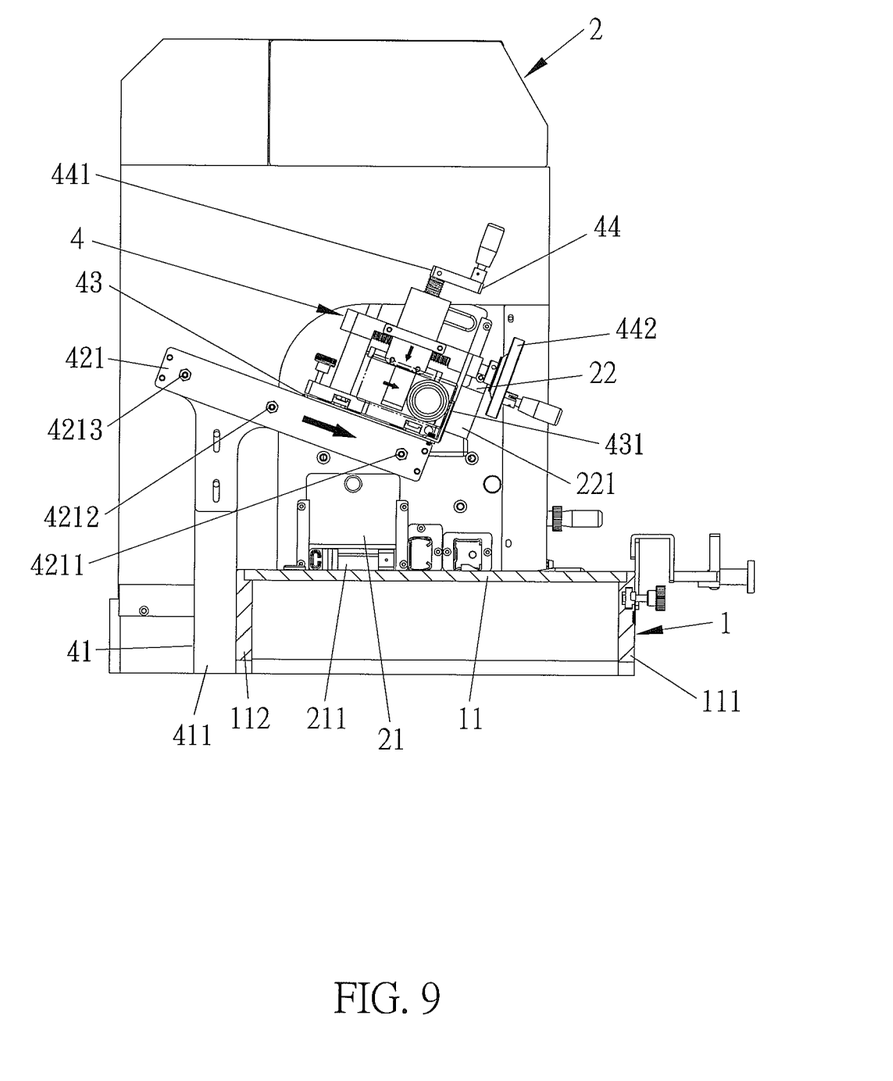
FIG. 9 is a cross sectional view showing the operation of an upper cutting assembly of the first cutting mechanism of the curtain cutting machine in accordance with the preferred embodiment of the present invention.

When the movable platform 4 matches with the upper cutting assembly 22 of the first cutting mechanism 2 to cut the curtain, as shown in FIGS. 7 to 9, the holding plate 43 of the movable platform 4 and the two slidable adjusting devices 42 are slid forward so that the first driving element 4211 and the second driving element 4212 of the two slidable adjusting devices 42 remove from the at least one second orifice 221 of the two seats 413 of the two support racks 41. After the holding plate 43 of the movable platform 4 slides to the predetermined position with the two slidable adjusting devices 42, the third driving element 4213 of the two slidable adjusting devices 42 retains in the at least one second orifice 221 of one of the two seats 413 of the two support racks 41 to position the two slidable adjusting devices 42 and the holding plate 43 and to align with the at least one second orifice 221 of the upper cutting assembly 22 of the first cutting mechanism 2, such that the curtain 5 is placed on the holding plate 43 and is clamped by the pressing unit 441 and the clamping unit 442 of the clamp device 44, thereafter a part of the curtain 5 is inserted into the at least one second orifice 221 of the upper cutting assembly 22 of the first cutting mechanism 2 and is cut by the upper cutting assembly 22.

Thereby, the curtain cutting machine of the present invention has advantages as follows:

As desiring to cut the curtain, the fixed platform 11 of the base 1 holds the curtain, and the lower cutting assembly 21 of the first cutting mechanism 2 or the cut set 31 of the second cutting mechanism 3 cuts the curtain. Preferably, the holding plate 43 of the movable platform 4 moves forward to hold the curtain 5, and the lower cutting assembly 21 of the first cutting mechanism 2 cuts the curtain. When the holding plate 43 of the movable platform 4 is not used, it moves backward to avoid interference, thus enhancing space using efficiency of the curtain cutting machine and suitable specification range.

While we have shown and described various embodiments in accordance with the present invention, it is clear to those skilled in the art that further embodiments may be made without departing from the scope of the present invention.

What is claimed is:

1. A curtain cutting machine comprising:
  a base including a fixed platform, and the fixed platform having a front segment and a rear segment;
  a first cutting mechanism disposed on a first end of the base and including a lower cutting assembly and an upper cutting assembly, wherein the lower cutting assembly has a plurality of first orifices flushing with the base, and the upper cutting assembly is mounted on the lower cutting assembly and has at least one second orifice;
  a movable platform secured on the fixed platform of the base and including two support racks, two slidable adjusting devices, and a holding plate, wherein the two support racks are arranged on a rear side of the fixed platform of the base and extend upwardly, each of the two slidable adjusting devices is mounted on each of the two support racks and moves forward and backward on each of the two support racks, the holding plate is connected with each slidable adjusting device to hold a curtain, and the holding plate moves forward and backward on the two support racks with the two slidable adjusting devices, when the holding plate moves forward to a predetermined position, it aligns with the at least one second orifice of the upper cutting assembly of the first cutting mechanism.

2. The curtain cutting machine as claimed in claim 1 further comprising a second cutting mechanism fixed on a second end of the base opposite to the first cutting mechanism, and the second cutting mechanism including a cut set having plural third orifices which flush with the fixed platform of the base.

3. The curtain cutting machine as claimed in claim 1, wherein each support rack has a post and has a tilted piece mounted on a top end of the post and slanting downwardly from its rear end to its front end, and the tilted piece has two seats disposed on one side surface thereof, wherein each seat has a first aperture passing through two sides thereof, and each of the two slidable adjusting devices of the movable platform has a fixing mount in which a sliding stem is fixed, the sliding stem is inserted into the first aperture of each seat of each support rack to slide.

4. The curtain cutting machine as claimed in claim 3, wherein each seat of each support rack has a second aperture defined in one end thereof, wherein the fixing mount of the slidable adjusting device has plural driving elements to retain in the at least one second orifice and to remove from the at least one second orifice as the holding plate is pulled.

5. The curtain cutting machine as claimed in claim 1, wherein the holding plate has a stopping portion arranged on a front rim of a top surface thereof.

6. The curtain cutting machine as claimed in claim 1, wherein the holding plate of the movable plate has a pulling portion formed on a bottom surface thereof.

7. The curtain cutting machine as claimed in claim 1, wherein the movable platform further includes a clamp device mounted on the holding plate to clamp the curtain.

8. The curtain cutting machine as claimed in claim 7, wherein the clamp device has a pressing unit and a clamping unit.

* * * * *